(12) United States Patent
Wu et al.

(10) Patent No.: US 8,582,811 B2
(45) Date of Patent: Nov. 12, 2013

(54) UNSUPERVISED PARAMETER SETTINGS FOR OBJECT TRACKING ALGORITHMS

(75) Inventors: Wencheng Wu, Webster, NY (US); Beilei Xu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 168 days.

(21) Appl. No.: 13/223,420

(22) Filed: Sep. 1, 2011

(65) Prior Publication Data
US 2013/0058523 A1    Mar. 7, 2013

(51) Int. Cl.
*G06K 9/00* (2006.01)

(52) U.S. Cl.
USPC .......................................................... 382/103

(58) Field of Classification Search
None
See application file for complete search history.

(56) References Cited

U.S. PATENT DOCUMENTS

| | | | |
|---|---|---|---|
| 6,647,361 | B1 | 11/2003 | Laird et al. |
| 6,754,663 | B1 | 6/2004 | Small et al. |
| 7,403,664 | B2 | 7/2008 | Porikli et al. |
| 7,460,691 | B2 * | 12/2008 | Ng et al. ...................... 382/107 |
| 7,859,431 | B2 | 12/2010 | Peddie et al. |
| 2005/0046597 | A1 | 3/2005 | Hutchison et al. |
| 2006/0170769 | A1 * | 8/2006 | Zhou ............................. 348/143 |
| 2008/0175161 | A1 * | 7/2008 | Amemiya et al. ............ 370/252 |
| 2008/0273752 | A1 * | 11/2008 | Zhu et al. ..................... 382/103 |

OTHER PUBLICATIONS

Young-Kee Jung and Yo-Sung Ho, "Traffic Parameter Extraction using Video-based Vehicle Tracking", 1999Intelligent Transportation Systems, IEEE/IEEJ/JSAI International Conference on, pp. 764-769.*
Jiang, F. et al., "Abnormal event detection based on trajectory clustering by 2-depth greedy search," IEEE Int'l Conf. on Acoustics, Speech, and Signal Process, pp. 2129-2132, Las Vegas / NV, Mar. 2008.
Yilmaz et al, "Object Tracking: A Survey," *ACM Computing Surveys* (2006) 38(4):1-45, Article 13, December.

* cited by examiner

*Primary Examiner* — Samir Ahmed
*Assistant Examiner* — Siamak Harandi
(74) *Attorney, Agent, or Firm* — Kermit D. Lopez; Luis M. Ortiz; Ortiz & Lopez, PLLC

(57) ABSTRACT

A method for automatically optimizing a parameter set for a tracking algorithm comprising receiving a series of image frames and processing the image frames using a tracking algorithm with an initialized parameter set. An updated parameter set is then created according to the processed image frames utilizing estimated tracking analytics. The parameters are validated using a performance metric that may be manually or automatically preformed using a GUI. The image frames are collected from a video camera with a fixed set-up at a fixed location. The image frames may include a training traffic video or a training video for tracking humans.

20 Claims, 7 Drawing Sheets

UNSUPERVISED PARAMETER SETTINGS FOR OBJECT TRACKING ALGORITHMS

TECHNICAL FIELD

Embodiments are generally related to the field of computer applications. Embodiments are also related to methods and systems for tracking objects.

BACKGROUND OF THE INVENTION

Object tracking has become increasingly prevalent in modern applications. This is particularly true in the field of vehicle tracking. Therefore, it is increasingly necessary for optimization of tracking algorithms and corresponding parameter settings.

For example, a rule specifying that a vehicle cannot climb a wall could be beneficial in developing a tracking algorithm. In practice, a common solution is to have a human manually specify suitable regions for object detection and tracking, and ignoring other regions such as walls. However, human intervention in such algorithms is expensive, time-consuming, and error prone. Therefore, it would be beneficial to automate the process of setting parameters for tracking algorithms utilizing application-dependent and environment-dependent information.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide for a method and system for object tracking.

It is another aspect of the disclosed embodiments to provide for an enhanced method and system for automatically setting parameters for tracking algorithms.

It is yet another aspect of the disclosed embodiments to provide an enhanced method and system for setting parameters for tracking algorithms using application-dependent and environment-dependent information.

The aforementioned aspects and other objectives and advantages can now be achieved as described herein. A method for parameter optimization comprises receiving a series of image frames and processing the image frames using a tracking algorithm with an initialized parameter set. An updated parameter set is then created according to the processed image frames and validated using a performance metric, thereby automatically optimizing the parameter set for the tracking algorithm.

Tracking analytics can also be estimated according to the image frames. Creating the updated parameter set can further comprise deriving the updated parameter set utilizing the estimated tracking analytics. Validating the updated parameter set further includes manually inspecting and/or modifying the updated parameter set using a graphical user interface associated with a computer.

The method also includes collecting image frames from a video camera with a fixed set-up at a fixed location, such as proximate to a road or sidewalk. The image frames may include a training traffic video or a training video for tracking humans.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
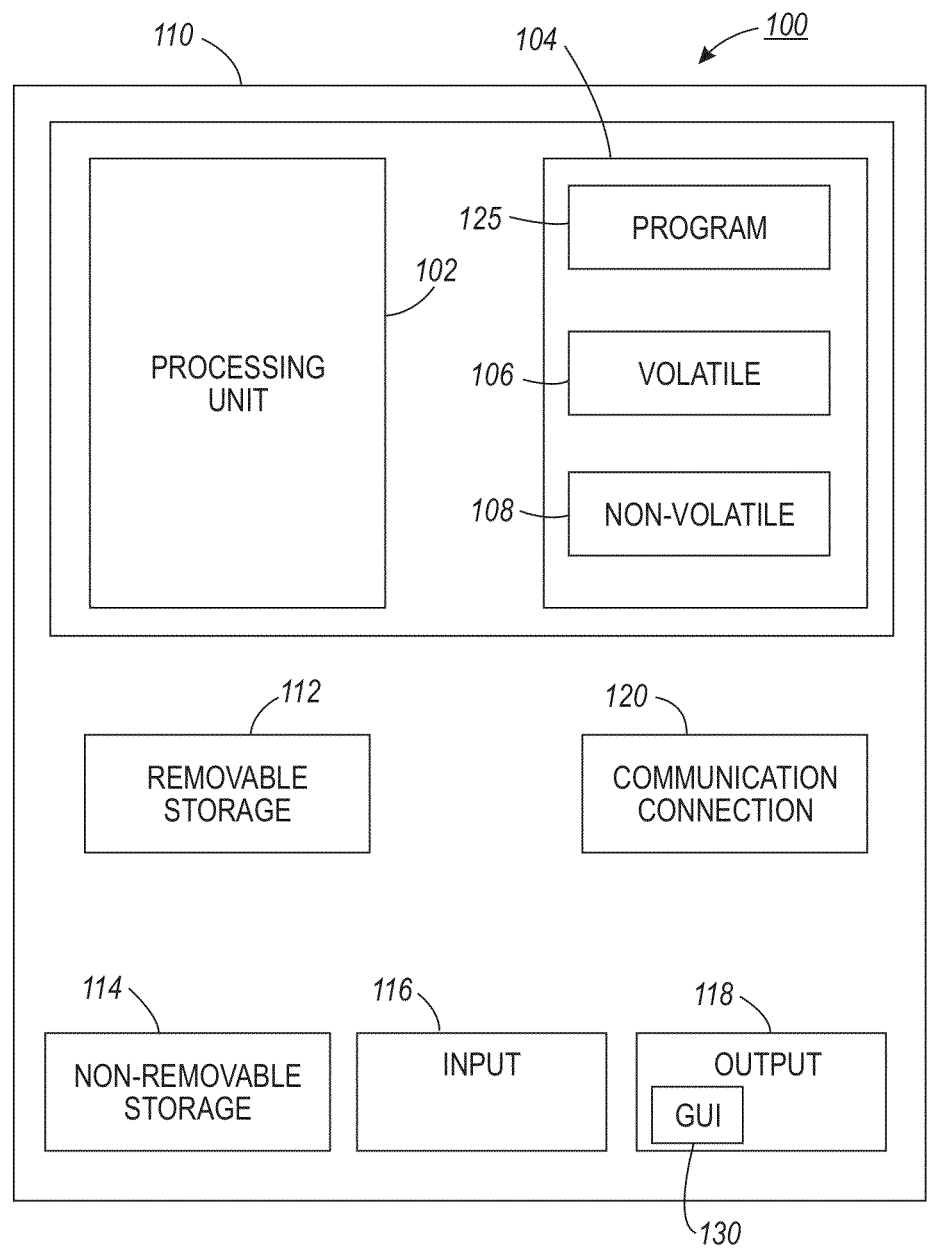
FIG. 1 depicts a block diagram of a computer system which is implemented in accordance with the disclosed embodiments.

A block diagram of a computer system 100 that executes programming for executing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions, as well as data, including video frames.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a photographic camera, video camera, tracking device, or the like. The communication connection may include a Local Area Network (LAN), a Wide Area Network (WAN) or other networks. This functionality is described in more detail in FIG. 2.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, avows a user to select and instruct computer system 100. A user interface can be provided using output 118 and input 116.

Output 118 may function as a display for displaying data and information for a user and for interactively displaying a graphical user interface (GUI) 130. An exemplary embodiment of GUI 130 is provided in FIGS. 6a and 6b below.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e,g., module 125) to handle these elements and report the user's actions. The GUI can further be used to display the electronic service image frames as discussed below.

Computer-readable instructions, for example, program module 125 are stored on a computer-readable medium and are executable by the processing unit 102 of computer 110. Program module 125 may include a computer application. A hard drive, CD-ROM, RAM. Flash Memory, and a USB drive are just some examples of articles including a computer-readable medium.

Figure 2:
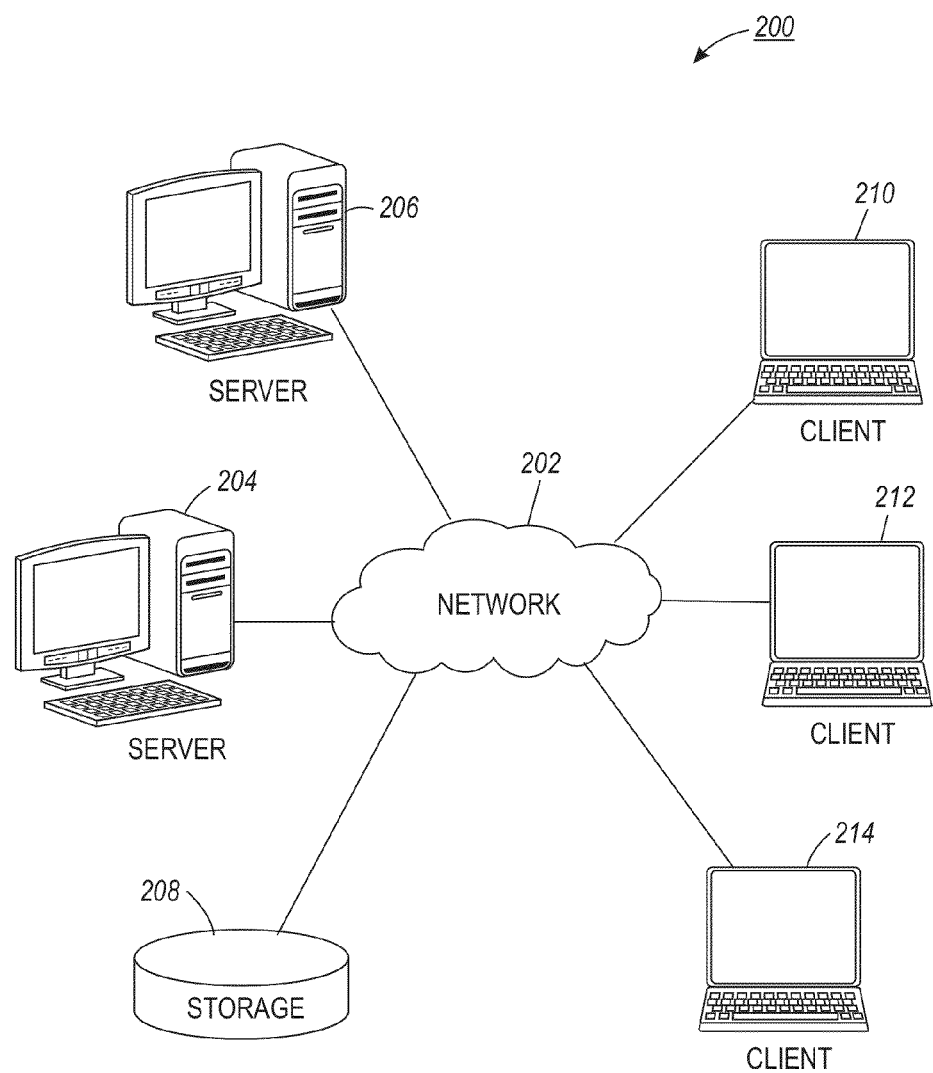
FIG. 2 depicts a graphical representation of a network of data-processing devices in which aspects of the present invention may be implemented.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communication links between various devices and computers connected together within a networked data processing system such as computer system 100. Network 202 may include connections such as wired communication links, wireless communication links, or fiber optic cables. Network 202 can further communicate with one or more servers 204 and 206 and a memory storage unit such as, for example, memory or database 208.

In the depicted example, server 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively clients 210, 212, and 214 may be, for example, a photographic camera, video camera, tracking device, etc.

Computer system 100 can also be implemented as a server, such as servers 204 and/or 206, depending upon design considerations. In the depicted example, server 204 provides data such as boot files, operating system images, applications, and application updates to clients 210, 212, and 214. Clients 210, 212, and 214 are clients to server 204 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 also may be implemented as a number of different types of networks such as, for example, an intranet, a local area network (LAN), or a wide area network (WAN). FIGS. 1 and 2 are intended as examples and not as architectural limitations for different embodiments of the present invention.

The following description is presented with respect to embodiments of the present invention, which can be embodied in the context of a data-processing system such as computer system 100, in conjunction with program 125, and data-processing system 200 and network 202 depicted in FIGS. 1 and 2. The present invention, however, is not limited to any particular application or any particular environment. Instead, those skilled in the art will find that the system and methods of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

Figure 3:
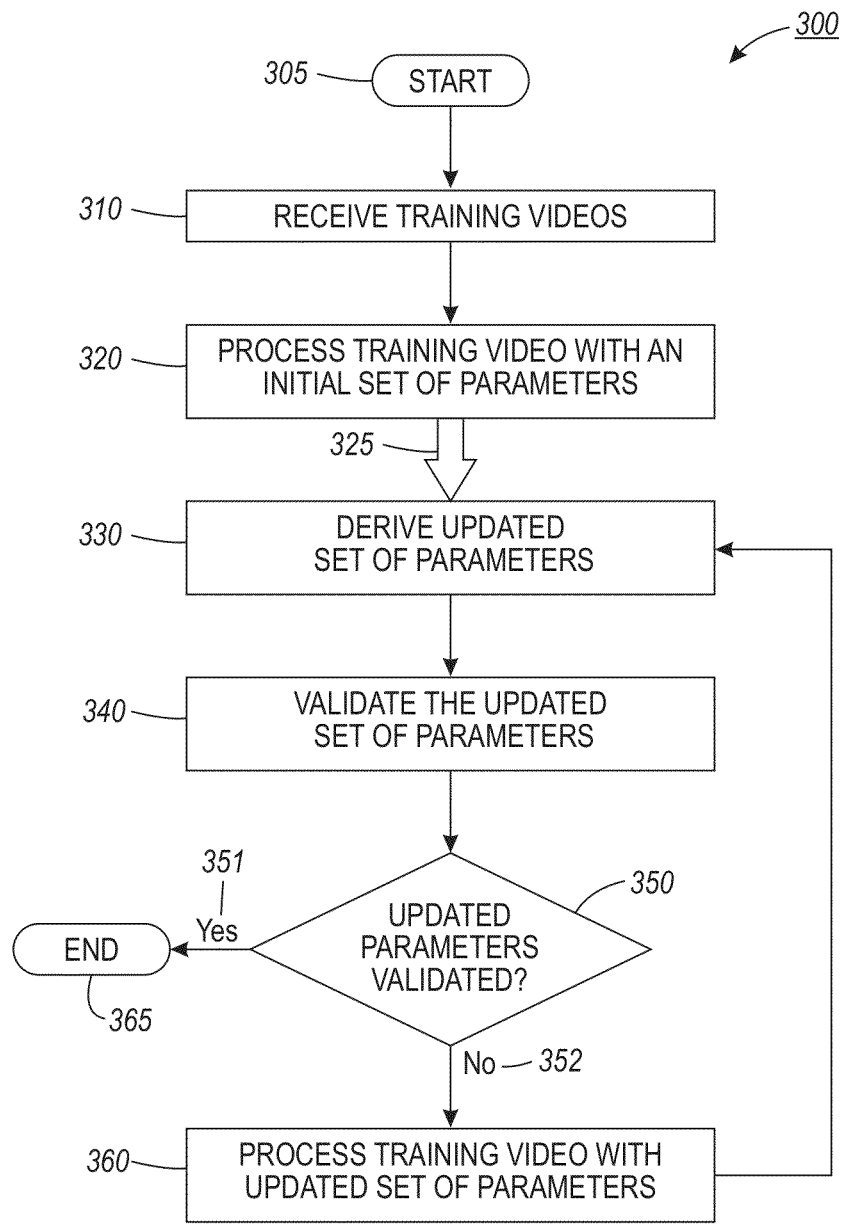
FIG. 3 depicts a high level flow chart illustrating logical operational steps in a parameter optimization method in accordance with the disclosed embodiments.

FIG. 3 illustrates a high level flow chart 300 of logical operations steps associated with a parameter optimization method in accordance with the disclosed embodiments. This method allows for unsupervised optimization of parameters used in vehicle or object tracking algorithms. The method begins at block 305.

Block 310 indicates that training data is received, for example, at a computer system 100. The training data may include video data such as data from a traffic video camera, a pedestrian video camera, or other tracking camera. In a preferred embodiment, the training video data and associated image frames are acquired from a camera with a fixed set-up at a fixed location. Such a location maybe a traffic signal, intersection, or any other point of interest.

One skilled in the art will appreciate that when a camera is deployed, the associated settings of the camera such as mounted height, tilted angle, zoom, pan, camera location, etc., will differ according to the location of the camera. Thus, it may be necessary to adjust the parameters used by the tracking algorithms accordingly. These parameters may include the following parameters disclosed herein.

A detection zone parameter associated with the regions where the vehicle detection is preformed. A generic detection zone parameter would use the entire region. This parameter may be manually or automatically adjusted to limit a detection zone to a specific region of interest. This decreases false readings from areas that are not of interest and/or typically troublesome for detection and tracking algorithms (e.g. occlusion due to other fixed object in the scene, branches that would move/shake due to wind, etc.) and improve computational efficiency. For example, a full detection zone of an intersection may include branches moving in the wind or a side road that is not of interest. The detection zone parameter can be adjusted to ignore these regions of the detection zone.

Threshold parameters for vehicle size can be used to determine whether the moving object in a detection zone is a vehicle. A reasonable range of vehicle sizes in real world dimensions can be established. However, camera settings can drastically affect sizes in the image pixel units provided by the camera. Image pixel units can therefore be converted to real world coordinates which requires a related set of environmental-dependent parameters to be incorporated in the parameter adjustment method.

A triggering parameter can be utilized to determine the timing for triggering image capture of a vehicle, its license plate number, or other identification. The triggering parameter can trigger one or more image frames for vehicle identification when a new vehicle is detected. For example, when a vehicle passes through the detection zone, the optimum time for capturing a license plate number to identify the vehicle may come as the vehicle passes through the lower right quadrant of the detection zone. The triggering parameter can be adjusted to trigger image capture as a vehicle passes through the lower right quadrant of the detection zone. The triggering parameter may also depend on the relative direction of traffic, the view angle of the camera, etc. These factors may all be used to find the region in the detection zone that corresponds the largest vehicle image so that the vehicle license plate is therefore the most recognizable.

Speed measurement parameters can be used to measure or derive the speed of a vehicle in the detection zone. For example, virtual loops can be used to measure speed. They generally consist of at least one pair of virtual lines arranged orthogonally to the lanes in the detection zone with a known distance between the lines. Speed can be derived by dividing the known distance between the lines by the time it takes for a vehicle to travel from one line to the other. Preferably, the physical distance between the virtual lines is significant, but not too far from the focus of the camera. If the line is to far from the focus, tracking becomes less robust as the traveling object gets smaller. Also, it is preferable to avoid areas of occlusion since the object tracking may be poor in those areas. For example, if the upper right quadrant is out of focus or occluded by trees, this is a poor choice for placement of the virtual line and will therefore need to be adjusted using the speed measurement parameter.

Other parameters such as lane classification rules, license plate size in the image pixel coordinates, projection distortion, common vehicle trajectory patterns, traffic flow, weather, time of day, and lane information threshold may all be used in the present invention. The forgoing description of parameters is not comprehensive or exclusive and is not intended to limit the scope of this application. Rather these parameters are intended to illustrate the nature of parameters that can be used in accordance with the present invention. One skilled in the art will appreciate that any number of other parameters may also be necessarily used in conjunction with the present invention.

The method then continues at block 320, which shows that the collected training data is processed using a selected algorithm with an initial set of parameters. The tracking algorithm may be, for example, a vehicle tracking algorithm. The initialization of the parameters is selected according to past experience with cameras located in similar situations. The initial parameter values need only be very roughly estimated. The training data is processed to estimate tracking analytics such as vehicle sizes and trajectories. The result may be a list of objects corresponding to objects moving through the detection zone as determined from the initial set of parameters. However, this data is likely not optimal as the initialized parameters likely resulted in significant computational waste, falsely detected objects corresponding to movement from unimportant objects, occlusion from branches or other natural obstacles, etc. These video analytics are illustrated by arrow 325. Thus, the parameters need to be adjusted.

Figure 4:
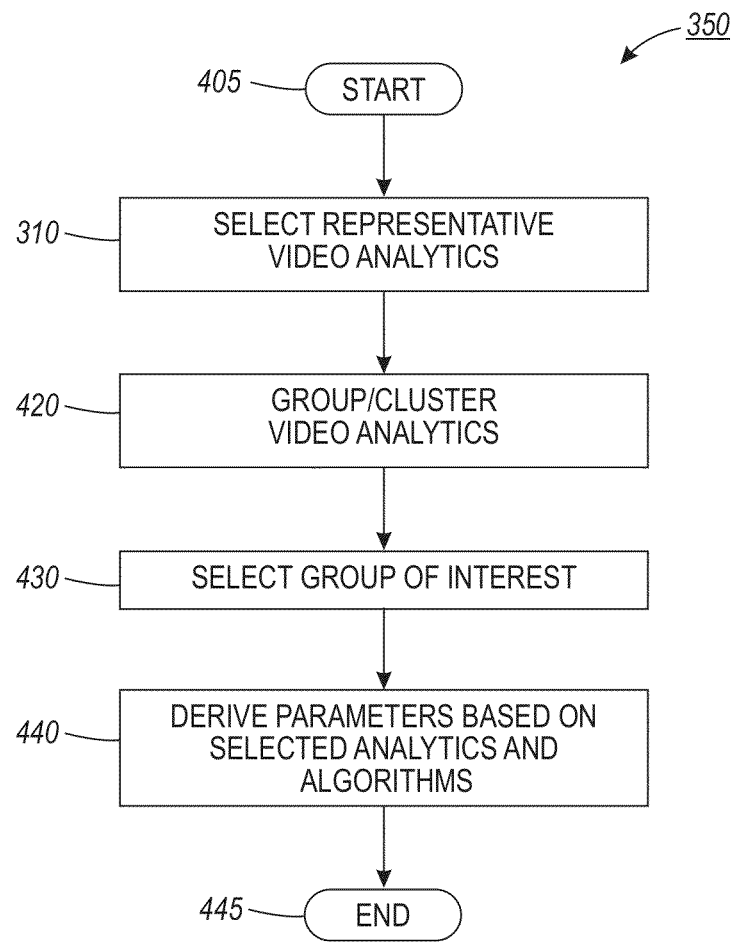
FIG. 4 depicts a detailed flow chart illustrating logical operational steps deriving an updated set of parameters in accordance with the disclosed embodiments.

Block 330 illustrates that an updated set of parameters is derived. In order to update the parameter set without supervision, it is necessary to further develop parameter derivation methods. This is displayed in FIG. 4, which illustrates an example of the detailed steps associated with block 330 of FIG. 3.

First, the method associated with step 330 begins as indicated by block 405. Next, the representative video analytics are selected as described by block 410. In this step, all the detected objects whose trajectories were very localized according to a predetermined threshold, or very short in time, are removed. This step helps eliminate false detections associated with moving branches or partial tracking due to occlusion.

At block 420, video analytics are grouped and/or clustered. In this step, trajectories are grouped based on their traveling direction. As an example, this step may include for each trajectory, applying a temporal filtering technique, fitting a smooth polynomial curve, calculating traveling direction, and classifying the trajectory using a K-means clustering approach. One skilled in the art will of course appreciate that other trajectory grouping methods may be used for more complex configurations of trajectories, for example, tracking of intersections, roundabouts, highways, etc.

The next step is to select groups of interest, as illustrated by block 430. This step entails selecting which of the above groups to keep according to some predefined parameters. This may be, for example, the average pixel size of objects in the group. This selection may also be made according to any defining factor deemed necessary for the particular situation. For example, in the case where large views are needed to view vehicle license plates for identification, it makes sense to mount and point the camera in the direction most suitable for this purpose. Thus, the group selected is that with the largest average pixel size to advantageously view the vehicle license plates.

Finally, parameters can be derived based on the selected analytics and algorithms as indicated by block 440. At this point in the method depicted in FIGS. 3 and 4, a group or several groups of interest have been identified. Now other useful parameters can be derived and updated.

For example, at this stage an optimal triggering rule determiner can be determined. Because the optimal trigger time for vehicle identification is when the object (such as the vehicle itself or even the vehicle's license plate) is largest, this becomes the optimal trigger time. This timing can be determined based on the trace of the object's size over time and the shapes of, for example, the license plates of the vehicles previously selected to be kept in the group. The optimal trigger parameter may also correspond to other factors such as when the object is least distorted.

Likewise, at step 440 a detection zone determiner parameter can be defined. As described above, bounding boxes related to the detection zone are created and examined when an object is first detected. To reduce noise, additional points along the trajectory can also be examined if necessary. The optimal detection zone is then defined as the minimal region that would enclose all the bounding boxes. Using a minimum allows for efficient computation by reducing the likelihood of choosing an occluded area or zones with travel in the wrong direction. However, it may also result in missed detections if the training video does not include the largest vehicle of interest. This problem can be solved in a variety of ways. The optimal detection zone can be manually increased according to a pre-specified percentage or by reviewing the training video to identify the largest vehicle. Otherwise, the bounding box can be adjusted according to data from the public database and using extrapolation to determine the largest common vehicle of interest. Finally, an optimal detection zone could be manipulated by applying a mask or increasing the number of corners in the zone. This operation would require a human to be preformed; however, minimal training of that person would be necessary as the adjustments are extremely simple.

Figure 5:
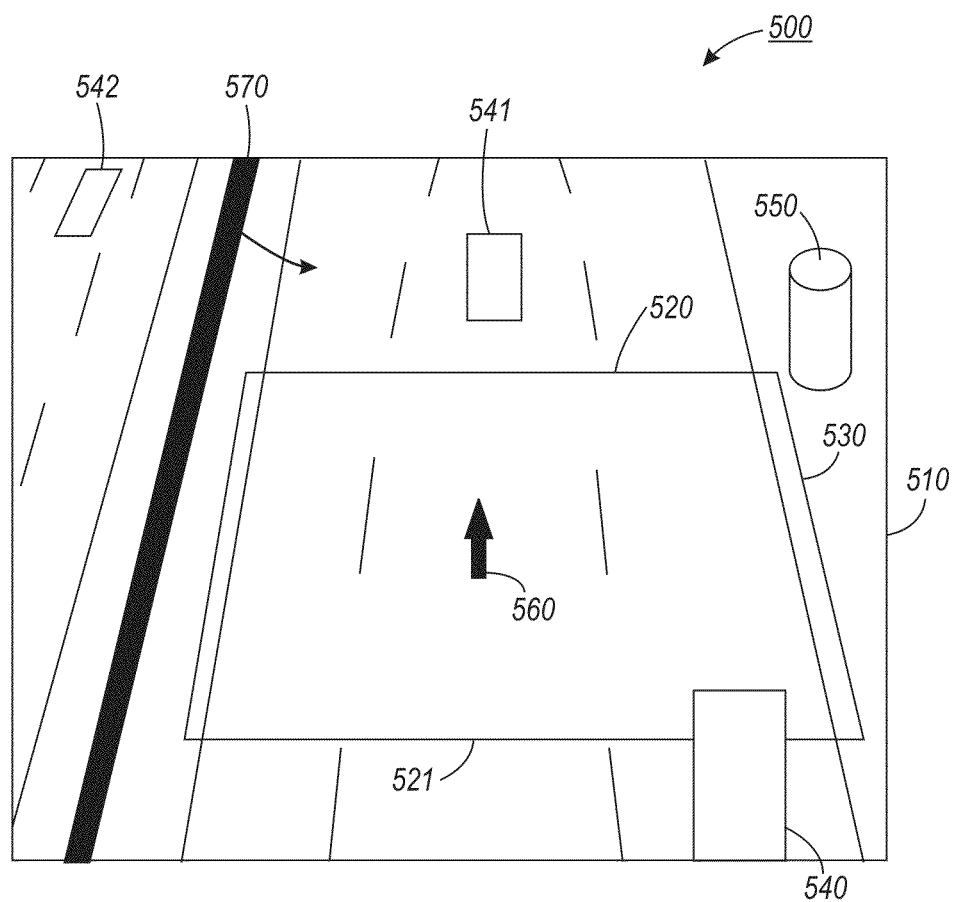
FIG. 5 depicts a representation of an image frame in accordance with the disclosed embodiments.

A virtual loops determiner parameter can be determined and used for speed measurement. An image frame 500 associated with a pair of virtual loops determiner parameters is illustrated in FIG. 5. FIG. 5 shows three objects 540, 541, and 542 being tracked in a detection zone 510. Arrow 560 indicates the direction of traffic on the right side of the road 570. First, the detected trajectories can be used to estimate the projective distortion (specified by a projective matrix) from the camera view. This provides an indication of the direction in the image that is orthogonal to the road so that the virtual loop can be set up. Next, the trajectories are converted to undistorted coordinates, where the virtual bop is simply defined by the horizontal lines 520 and 521 shown in FIG. 5. Finally, a determination of which horizontal lines are optimal can be made. In general, the two lines 520 and 521 should be placed as far apart as possible while they still enclose sections of the trajectories for some percentage of the objects being tracked. This allows for interpolation, rather than extrapolation, of the exact time for an object to cross the virtual loop. In addition, the larger distance allows for a speed measurement that is less sensitive to error associated with the distance between the two horizontal lines 530 in the virtual loop.

Alternatively, the virtual loop can be defined by detecting road marks and/or known landmarks in the detected region such as, for example, landmark 550. This may be particularly useful where existing infrastructure is in place. This may further be supported by existing information or infrastructure provided by the Department of Transportation or other such organizations. If such infrastructure exists and the road marks or landmarks have known distances between them, the projective distortion can be estimated using that information. The virtual loops will be placed as close to the landmark as possible without running through an occlusion zone, or when necessary, with minimal overlap of an occlusion zone. This method can be used to fine-tune a virtual loop parameter method and may optionally be used as a suggested optimal virtual loop, which can later be validated or adjusted by a human being.

Other factors may also need to be addressed with respect to the virtual loops. For example, estimates of acceleration may be necessary. This can be achieved by sub-dividing the regions between two virtual loops evenly in undistorted space to generate extra virtual loops for more fine resolution of speed measurements.

A lane classification determiner may also be identified. This parameter is simply used to identify the lanes that vehicles are traveling in at a certain time of day or over a certain stretch of road. This parameter may be useful in identifying aggressive drivers. The present embodiment of the invention allows for lane identification training based on an initial video sequence, which shows vehicles traveling along lanes of interest. A trajectory clustering method such as Gaussian Mixture Model (GMM), which is based on the (x,y) locations and, optionally, the size of the detected bounding box of a vehicle for each point along a given trajectory, can be used to group the observed trajectory into a set of lanes in the scene. The mean trajectory of each identified lane in the set of lanes is then calculated. The location associated with the mean trajectory of each lane is stored. When a new trajectory is observed at run-time, that trajectory's distance from the mean trajectory is calculated. A present threshold is then used to automatically determine to which lane the new trajectory belongs. A human being can periodically review this labeling and correct any mislabeled trajectories. These trajectories can then be used to update the stored mean trajectory location.

A number of other parameter determiners may also be used. These extensions include determiners for the size of license plates, the projective distortion matrices for license plates associated with each lane, vehicle template extraction, parameters associated with the time, date, or weather conditions of a given scene, or other useful parameters. Some of these extensions would require larger sets of training videos, for example, samples across varying weather conditions. Likewise, some may require specific self-learning algorithms that can be developed as needed.

At this point, the method shown in FIG. 3 continues at block 340 where a validation of the updated set of parameters can be preformed. This validation can be based on a preselected performance metric or by a manual inspection. For example, the training video can now be re-analyzed with the updated set of parameters to determine whether the unsupervised learning has been effective according to a preselected performance metric. The performance metric can include a consideration of the computational cost where that cost should use equal or less memory and time to finish; the detection rate, wherein no vehicles of interest have been missed; and the convergence of the updated set of parameters.

Block 350 relates to checking for convergence of the updated set of parameters. If the parameters are validated as shown at block 351, the method ends. If the parameters are not validated as shown by block 352, the training video is processed again with the updated set of parameters and then returns to block 330 where the steps are repeated. In this way, an iterative loop is created to check for the convergence of the updated set of parameters.

The method described above may require calibration and/or periodic human intervention in order to achieve a desired level of accuracy. Therefore, it is another aspect of the present invention to provide a computer-aided tool for simplifying the parameter settings that are application-dependent and environment-dependent. This can be achieved using a graphical user interface (GUI) in conjunction with the computer system and network shown in FIGS. 1 and 2. An example of a GUI 130 shown in FIG. 1 is provided to help a human validate or adjust the updated parameters derived through the unsupervised learning method described above in FIGS. 3 and 4.

Figure 6A:
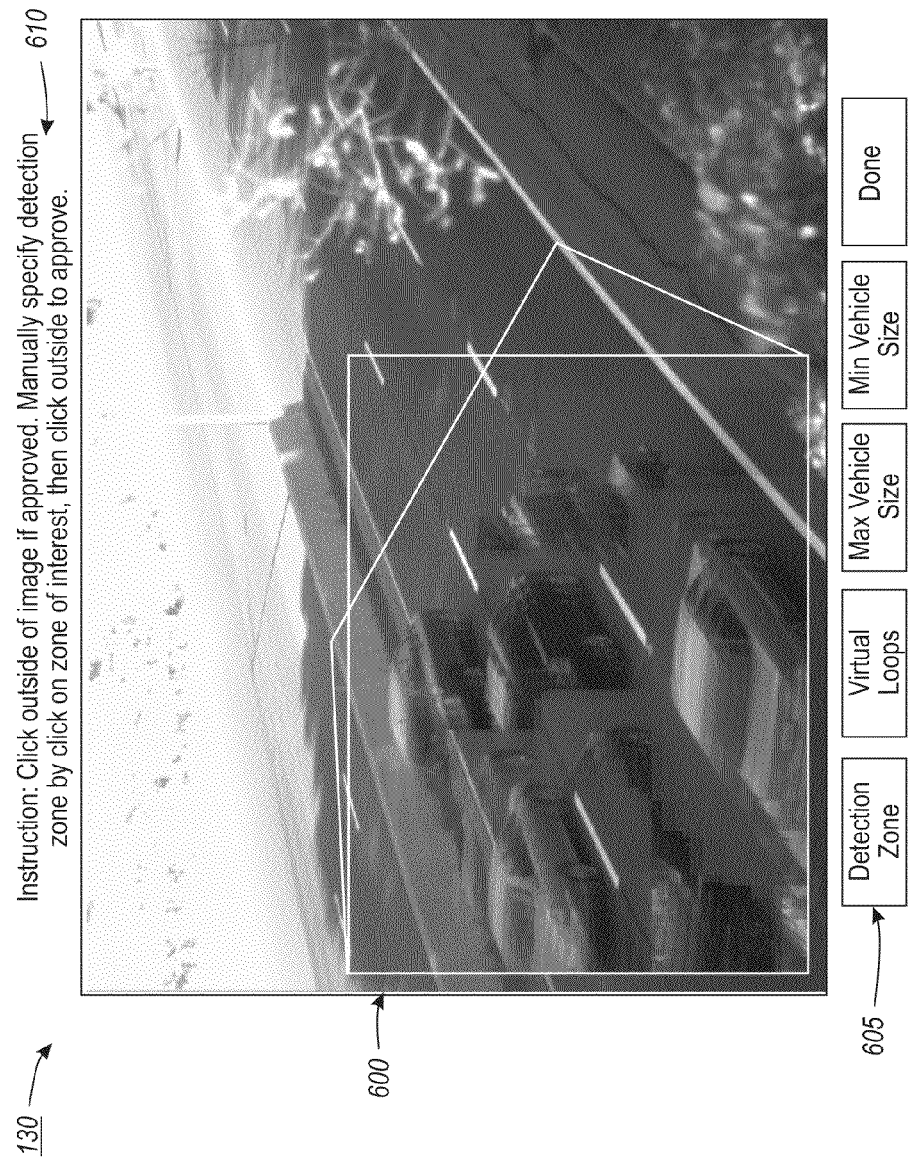
FIG. 6a depicts an exemplary graphical user interface for validating and modifying parameter settings in "Detection Zone" mode.
Figure 6B:
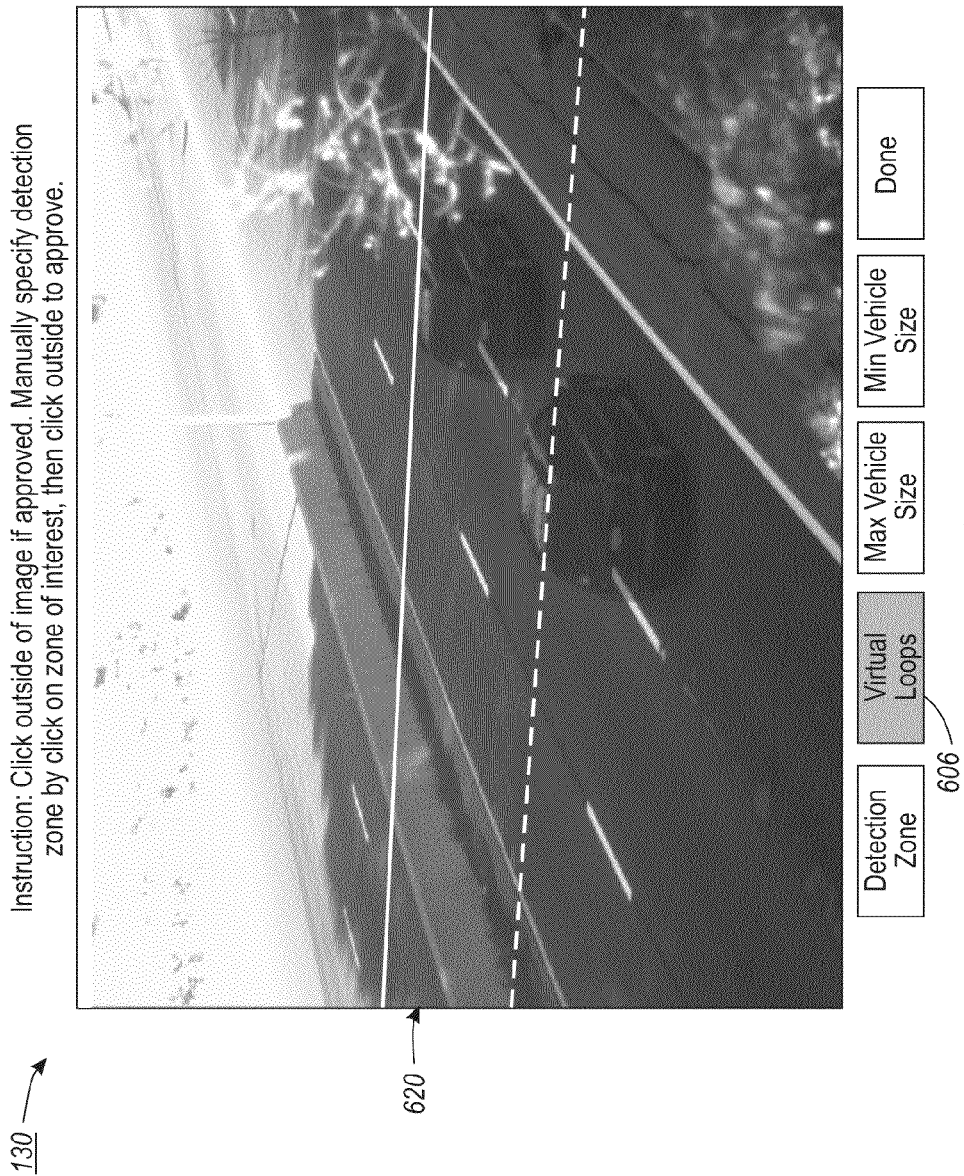
FIG. 6b depicts an exemplary graphical user interface for validating and modifying parameter settings in "Virtual Loops" mode.

An exemplary GUI for validating or modifying parameter settings is shown n FIGS. 6a and 6b. In general, the GUI 130 illustrated in FIG. 6a provides various scenes from the detection zone such as detection zone 600. This may include overlapped images of detected objects when they are first detected and the optimal detection zone. The user can then approve or modify the scene through the GUI. The overlayed objects and detection zones provided from the method of FIGS. 3 and 4 help guide the user. For example, if no large vehicle is found in the overlay image, the user can increase the detection zone 600. Further, a number of buttons 605 are provided by the GUI that allows for aided manipulation of the parameter settings. The GUI 130 may also provide the user instructions in how to operate the GUI such as instructions in upper bar 610. The GUI may also include standard drawing functions (not shown) in the upper bar 610 that allow a user to manipulate the lines and polygons shown in the GUI.

For example, in FIG. 6b virtual loops button 606 is provided in the GUI 130. Activating this button will select one detected object from the video data and overlap the two images of this object when it intersects the optimal loop 620 (i.e. at two different times). The user can investigate the data provided by the automated method and either approve or modify it using the GUI. For example, the GUI may be used to guide the user to modify the horizontal lines that define the virtual loop 610 to align with the edges of the vehicle or orthogonally to the road direction.

Thus the GUI, for example GUI 130, may be used to show some of the automatically generated video analytics superimposed with a set of video frames to help guide the operator on how best to choose or modify the parameters. One skilled in the art will appreciate that any number of parameters associated with the video analytics may be manually adjusted or approved in this way. GUI 130 can also include sliders or manual text fields (not shown) that can be used, for example, to modify vehicle size thresholds, or other numerical parameters associated with the parameters.

Based on the foregoing, it can be appreciated that a number of embodiments, preferred and alternative, are disclosed herein. For example, in one embodiment, a method can be implemented for parameter optimization. Such a method can include, for example, receiving a series of image frames, and processing the series of image frames utilizing a tracking algorithm with an initialized parameter set. Such a method can also include creating an updated parameter set according to image frames processed from among the series of image frames, and validating the updated parameter set utilizing a performance metric to automatically optimize the parameter set for the tracking algorithm.

In another embodiment, the operation or step for receiving the series of image frames can further comprise collecting the series of image frames from at least one video camera with a fixed set-up at a fixed location. In other embodiments, the operation or step for processing the series of image frames can further comprise estimating tracking analytics according to received image frames from among the series of image frames. In yet another embodiment, the operation or step of creating the updated parameter set according to image frames processed from among the series of image frames, can further comprise deriving the updated parameter set utilizing the tracking analytics estimated in response to estimating the tracking analytics according to received image frames from among the series of image frames.

In still other embodiments, the aforementioned series of image frames can be a training traffic video and/or a training video for tracking a human. In yet other embodiments, the operation or step of validating the updated parameter set utilizing the performance metric to automatically optimize the parameter for tracking, the tracking algorithm can further comprise validating the updated parameter set by manually inspecting the updated parameter set utilizing a graphical user interface associated with a computer. In another embodiment, the step of validating the updated parameter set by manually inspecting the updated parameter set using the graphical user interface associated with the computer can further include displaying video analysis of the image frames thereby providing a semi-automated update of the parameter set.

In another embodiment, a method for parameter optimization can be implemented. Such a method can include receiving a series of image frames collected from a video camera with a fixed set-up at a fixed location; processing the series of image frames utilizing a tracking algorithm with an initialized parameter set; estimating tracking analytics according to image frames received from among the series of image frames; creating an updated parameter set utilizing the tracking analytics, according to processed image frames from among the series of image frames; and validating the updated parameter set utilizing a performance metric to automatically optimize the parameter set for the tracking algorithm.

In still another embodiment, a system for parameter optimization can be provided, which includes, for example, a processor, a data bus coupled to the processor, and a computer-usable medium embodying computer code. The computer-usable medium can be coupled (e.g., electrically connected or in electrical communication) to the data bus. The computer program code can comprise instructions executable by the processor and configured for receiving a series of image frames, processing the series of image frames utilizing a tracking algorithm with an initialized parameter set, creating an updated parameter set according to processed image frames among the series of image frames, and validating the updated parameter set utilizing a performance metric to automatically optimize the parameter set for the tracking algorithm.

In other embodiments, such instructions can be further configured for collecting the series of image frames from a video camera with a fixed set-up at a fixed location. In another embodiment, such instructions can be configured for estimating tracking analytics according to image frames received from among the series of image frames. In yet another embodiment, such instructions can be further configured for deriving the updated parameter set utilizing the estimated tracking analytics. In another embodiment, the aforementioned series of image frames can comprise, for example, a training traffic video and/or a training video for tracking a human.

In still other embodiments, such instructions can be further configured for validating the updated parameter set by manually inspecting the updated parameter set utilizing a graphical user interface associated with a computer. In another embodiment, such instructions can be configured for validating the updated parameter set by displaying video analysis of the series of image frames and manually inspecting the updated parameter set utilizing the graphical user interface associated with the computer to provide a semi-automated update of the parameter set.

While the embodiments have been particularly shown and described herein, it will be understood by those skilled in the art that various changes in form and detail may be made therein without departing from the spirit and scope of such embodiments. It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for parameter optimization, said method comprising:
    receiving a series of image frames; processing said series of image frames utilizing a tracking algorithm with an initialized parameter set;
    creating an updated parameter set according to image frames processed from among said series of image frames; and
    validating said updated parameter set utilizing a performance metric to automatically optimize said parameter set for said tracking algorithm by manually inspecting said undated parameter set utilizing a graphical interface associated with a computer.

2. The method of claim 1 wherein:
receiving said series of image frames further comprises: collecting said series of image frames from at least one video camera with a fixed setup at a fixed location; and
processing said series of image frames further comprises: estimating tracking analytics according to received image frames from among said series of image frames.

3. The method of claim 1 wherein validating said updated parameter set utilizing a performance metric to automatically optimize said parameter set for said tracking algorithm by manually inspecting said updated parameter set using said graphical user interface associated with said computer further includes: displaying video analysis of said image frames thereby providing a semi-automated update of said parameter set.

4. The method of claim 1 wherein receiving said series of image frames further comprises: collecting said series of image frames from at least one video camera with a fixed setup at a fixed location.

5. The method of claim 4 wherein processing said series of image frames further comprises: estimating tracking analytics according to received image frames from among said series of image frames.

6. The method of claim 5 wherein creating said updated parameter set according to said processed image frames from among said series of image frames, further comprises: deriving said updated parameter set utilizing said estimated tracking analytics in response to estimating said tracking analytics according to said received image frames from among said series of image frames.

7. The method of claim 6 wherein said series of image frames co p se a training traffic video.

8. The method of claim 6 wherein said series of image frames co p se a training video for tracking a human.

9. A method for parameter optimization, said method comprising:
receiving a series of image frames collected from a video camera with a fixed set-up fixed location;
processing said series of image frames utilizing a tracking algorithm with an initialized parameter set;
estimating tracking analytics according to image frames received from among said series of image frames;
creating an updated parameter set utilizing said tracking analytics according to said processed image frames from among said series of image frames; and
validating said updated parameter set utilizing a performance metric to automatically optimize said parameter set for said tracking algorithm wherein validating said updated parameter set further includes: validating said updated parameter set by manually inspecting said updated parameter set utilizing a graphical user interface associated with a computer.

10. The method of claim 9 wherein said series of image frames comprise at least one of: a training traffic video and a training video for tracking a human.

11. The method of claim 9 wherein:
receiving said series of image frames further comprises: collecting said series of image frames from at least one video camera with a fixed setup at a fixed location; and
processing said series of image frames further comprises: estimating tracking analytics according to received image frames from among said series of image frames.

12. The method of claim 9 wherein validating said updated parameter set by manually inspecting said updated parameter set utilizing said graphical user interface associated with said computer further comprises:
displaying video analysis of said series of image frames to provide a semi-automated update of said parameter set.

13. A system for parameter optimization, said system comprising:
a processor;
a data bus coupled to said processor; and
a computer-usable medium embodying computer code, said computer-usable medium being coupled to said data bus, said computer program code comprising instructions executable by said processor and configured for:
receiving a series of image frames; processing said series of image frames utilizing a tracking algorithm with an initialized parameter set;
creating an updated parameter set according to said processed image frames among said series of image frames: and
validating said updated parameter set utilizing a performance metric to automatically optimize said parameter set for said tracking algorithm by manually inspecting said updated parameter set utilizing a graphical user interface associated with a computer.

14. The system of claim 13 wherein said instructions are further configured for:
collecting said series of image frames from a video camera with a fixed set-up at a fixed location; and
estimating tracking analytics according to said image frames received from among said series of image frames.

15. The system of claim 13 wherein said instructions are further configured for:
validating said updated parameter set by displaying video analysis of said series of image frames; and
manually inspecting said updated parameter set utilizing said graphical user interface associated with said computer to provide a semi-automated update of said parameter set.

16. The system of claim 13 wherein said instructions are further configured for: collecting said series of image frames from a video camera with a fixed set-up at a fixed location.

17. The system of claim 16 wherein said instructions are further configured for: estimating tracking analytics according to said image frames received from among said series of image frames.

18. The system of claim 17 wherein said instructions are further configured for: deriving said updated parameter set utilizing said estimated tracking analytics.

19. The system of claim 18 wherein said series of image frames comprise a training traffic video.

20. The system of claim 18 wherein said series of image frames comprise a training video for tracking a human.

* * * * *